Nov. 18, 1947.   J. GARGAN   2,431,170
METHOD OF MAKING PIECED SOLE BLANKS
Filed Jan. 3, 1946
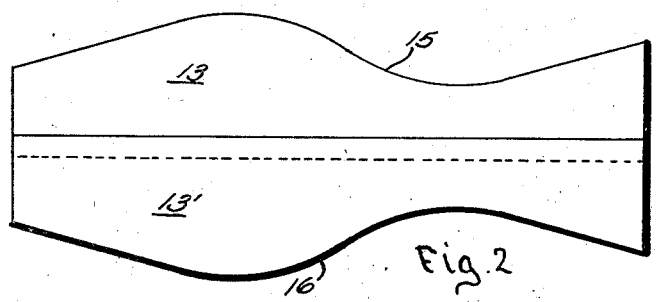
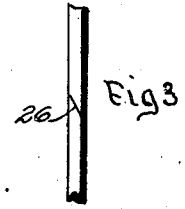
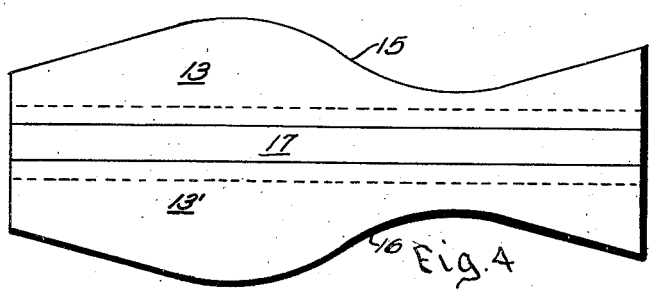
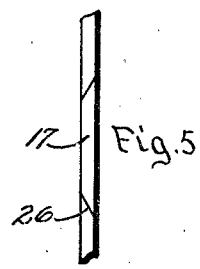
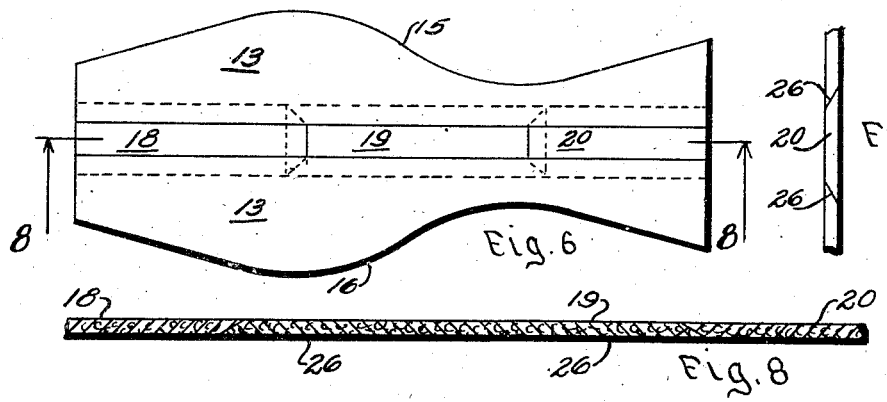
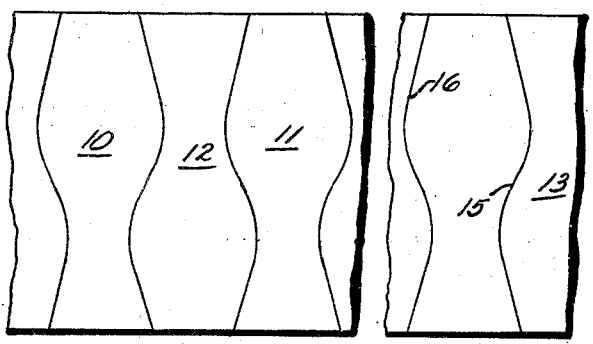
INVENTOR
Joseph Gargan
by Fred W McArdle
atty Patented Nov. 18, 1947

2,431,170

UNITED STATES PATENT OFFICE 2,431,170

METHOD OF MAKING PIECED SOLE BLANKS

Joseph Gargan, Brookline, Mass., assignor of one-half to Walter T. Miller, Manchester, Mass.

Application January 3, 1946, Serial No. 638,759

1 Claim. (Cl. 12—146)

My invention relates to pieced shoe soles and particularly to sole blanks of this character fabricated from scrap material left from sections of leather from which sole blanks have been produced by the stripper die method.

When this method is used, a section of leather across the hide is taken, of a width equal to the length of the blanks to be produced. On this section, a pair of cutting dies operate, of a contour and so spaced, as to produce the required blank. After the first blank is cut, the section of leather is moved to a position for cutting a second blank, the spacing being such that, between the first and second blank, a third blank is produced in reversed position, the cutting dies being so formed as to produce the same contour on the intermediate blank as in the other two, produced by direct cutting.

As the width of the hide and the width of the blanks vary, there is always a fragment left at the end of operations on a section, and this fragment may have a cut outline made by either cutting die, according to conditions. The fragments left from a plurality of sections, are selected in pairs according as one or the other cutting dies has made the final cut on the different sections. These elements are trimmed on a line parallel to a median line from heel to toe, and as will be described, are cemented together to form a sole blank.

While it is old in the art to fabricate a pieced sole, I do not know nor believe that a shoe sole has been fabricated from scrap material disposed lengthwise of the sole. In many cases, scrap material disposed crosswise of the sole has been used, but in the flexing of the sole incident to wear, there is a constant tendency to part the scrap sections at the joints, but with my invention the flexing of the finished sole is the same as the natural flexing of a one piece sole, or one in which the forepart and shank are in one piece.

One object of my invention is to fabricate a pieced sole blank from scrap left from the operations of the strip cutting method for cutting sole blanks, the elements used being cemented together longitudinally and the contour being the same as the one piece blank.

A second object is to provide a sole blank of this character in which suitable sole material other than leather may be cemented to and between the major elements of leather, to provide a wider blank, having the same contour as the one piece sole blank.

My invention consists in providing a pieced sole blank, fabricated from scrap leather left from the respective cutting dies used in the strip cutting method for cutting sole blanks, selected pairs being trimmed longitudinally on a line parallel with the median line of the sole blank from heel to toe, the contiguous edges being bevelled to supplementary angles, and cemented together or to an inserted section to form a pieced sole with the same outline as a one piece sole formed by the pair of cutters.

In the accompanying specification and claims and the drawings forming a part thereof, I have described and illustrated preferred forms of my invention.

In the drawings,

Fig. 1 is a diagram of a section of leather from which sole blanks are cut by the strip die method.

Fig. 2 shows a sole blank formed from the scrap left from the operations of respective cutting dies.

Fig. 3 is an enlarged end view showing the manner in which the joints are made.

Fig. 4 shows a blank in which an insert of suitable scrap material is inserted to obtain the proper width of the blank.

Fig. 5 is an enlarged end view showing the manner in which the elements are joined.

Fig. 6 is a blank similar to that shown in Fig. 4, in which a plurality of scrap sections are joined to form the insert.

Fig. 7 is an enlarged end view.

Fig. 8 is a section enlarged, on the line 8—8, Fig. 6.

Referring to the drawings,

In Fig. 1 is indicated a plurality of sole blanks as they are cut by the strip die method; the blank 10 is cut by the operation of two cutting dies properly spaced for the required sole blank; the strip of leather being moved to position shown at 11, another blank is cut. Between 10 and 11 a third blank is formed in a reversed position as the dies are so formed that this, 12 has the same contour as 10 or 11. At the end of the strip the last operation of the dies leaves a scrap end 13. The cut may be from the cutting die which formed the outline 15, or it may be the outline 16 formed by the other die, 13' depending on the width of the hide and the blank.

The result is that in a run of sole blanks there will be a plurality of both patterns of scrap. These are selected in pairs, trimmed longitudinally on a line parallel with the median line from heel to toe; the straight edges formed in bevels to supplementary angles, as at 26, and cemented under pressure after the elements are made of equal thickness.

It will be obvious that the width of scrap pieces left on different strips will vary, and in that case to form a sole blank with the proper width, inserted scrap sections are required as shown at 17. These are formed with angles supplementary to the angles of the major elements, and if necessary reduced to an even thickness with the major elements, and then cemented thereto. It is not essential that the insert be of one piece and in Fig. 6 I have shown an insert fabricated from several pieces, 18, 19, 20, joined in the manner described.

Other material than leather, such as rubber, composition and the like may be used for inserts.

Having thus described my invention, I claim:

A method for utilizing scrap from sole material on which strip cutting dies have operated, in which end scrap fragments are selected in pairs according to the outline left by the respective right and left dies, are trimmed on contiguous edges on a line from heel to toe, retaining the outline left by respective dies, said edges being beveled to supplementary angles, and cemented to form the right and left elements of a pieced sole blank.

JOSEPH GARGAN.

REFERENCES CITED

The following references are of record in the file of this patent:

UNITED STATES PATENTS

| Number | Name | Date |
|---|---|---|
| 101,399 | Woodley | Mar. 29, 1870 |
| 197,636 | Hummel et al. | Nov. 27, 1877 |

FOREIGN PATENTS

| Number | Country | Date |
|---|---|---|
| 141,652 | Great Britain | Apr. 22, 1920 |
| 85,668 | Austria | Sept. 26, 1921 |